UNITED STATES PATENT OFFICE

2,604,447

AQUEOUS WELL-DRILLING FLUIDS

George W. Cummer, Los Angeles, and Delmar H. Larsen, West Hollywood, Calif., assignors to National Lead Company, New York, N. Y., a corporation of New Jersey No Drawing. Application July 29, 1948, Serial No. 41,418

5 Claims. (Cl. 252—8.5)

This invention relates to aqueous mud-laden well drilling fluids.

Starch has been heretofore modified to various dextrins by the following methods: by the action of enzymes—α amylase and/or β amylase; by aqueous acids and heat; by aqueous bases and heat; by various oxidizers and heat; by heat alone—torrefaction dextrins. The variations of the above methods are numerous, and combinations of the processes multiply the number of variations still more. Most of these processes have for their purpose to produce dextrins of different properties.

The methods now used in torrefaction processes are to heat a starch fairly rapidly to 120–130° C., and then to reduce the rate of heating until the final dextrinization temperature is reached where it is maintained. Dextrinization temperatures as high as 175° C. are frequently used, and some manufacturers use temperatures in the neighborhood of 200° C. Those temperatures are, however, maintained for long periods of time, viz., up to eight and one-half or nine hours.

In the drilling of wells, more particularly by the rotary method of drilling, an aqueous mud-laden drilling fluid is employed in which the liquid phase is water. The solid phase in such a fluid may be a native drilling clay, or a concentrated colloidal clay. In fresh water fluids, a bentonite of the Wyoming-South Dakota type may be employed, while in salt water fluids a fuller's earth of the Georgia-Florida type may be employed. The drilling fluid is pumped into the bore-hole and back to the surface, causing a solid component of the fluid to be deposited on the bore-hole wall. Such a drilling fluid is subject to additions thereto of formation solids, fluids and salts during the course of drilling so that the status of the drilling is changed during drilling. In order to attain low water losses, a starchy material, such as gelatinized starch is employed, but this is subject to deterioration during the course of drilling; such deterioration may be inhibited by the employment of a concentrated salt fluid, a preservative such as paraformaldehyde, and by maintaining the fluid at a high pH, viz., 12.

One object is to provide a process of treating aqueous drilling fluids with a modified starch dextrin.

Another object is to provide a novel aqueous well-drilling fluid.

Further objects will appear from the detail description, in which will be set forth a number of embodiments of this invention; it will be understood, however, that this invention is susceptible to various embodiments within the scope of the appended claims.

In accordance with illustrative embodiments of this invention, a starchy material is heated to a temperature of 220–250° C., and then allowed to cool. This temperature is materially higher than the temperatures heretofore employed, viz., 175°–200° C. The heating is done rapidly, to bring the starchy material quickly to the temperature of 220–250° C. The heating of the starchy material is also maintained for a short period, after which it is allowed to cool.

In accordance with an illustrative embodiment of this invention, an air-dried starch is added to a fire-clay scorifier, which was at a temperature of 250° C. The scorifier, with the starch therein, is placed within an electric furnace maintained at a temperature of 250° C. The starch is then heated to 225° C. in thirteen minutes, and maintained at that temperature for two minutes, after which the scorifier is removed from the furnace and allowed to cool. The starch is agitated and mixed continuously during the fifteen minute heating and four minute cooling period. The total time from the adding of the starch to the scorifier until the dextrin is taken out is thus about nineteen minutes. The resulting product is a beige-colored powder, two grams of which dispersed in 10 cc. of distilled water has a pH of about 4.

The above will show the distinction between the process embodying this invention and those of the prior art. The temperature to which the starchy material is subjected is materially higher than heretofore employed. The period of heating is for a short period, viz., a matter of minutes; as distinguished from the long period of heating, viz. hours, as in the prior art. Furthermore, the present process involves a matter of simple heating without addition of acids, bases or oxidizing agents, and there is a neutral conversion. The very short heating or roasting period, furthermore, avoids charring.

The starches which may be modified in accordance with the above-described process may be various starchy materials, such as corn, arrow-root, tapioca, sago, and potato starches, although corn, arrow-root and tapioca starches give the best results, particularly when an air-dried starch is employed as a base for treatment in the manner described.

It is believed that the resulting product is a distinctly new product, as distinguished from those of the prior art. This product is capable of use for various purposes, but has been found particularly useful in treatment of well-drilling fluids, as have also other modified-starch dextrins produced in accordance with the prior art.

However, the modified starch dextrins produced in accordance with the above-described process have a special utility in the treatment of well-drilling fluids.

The modified starch dextrins produced in accordance with the prior art processes are suitable for the treatment of drilling fluids in order to obtain the desired low water losses, and those which are particularly suitable are the dextrins which have a pH of between 3 and 6; and as noted above, the dextrin produced in accordance with the above-described applicants' process has a pH of about 4. These dextrins may be added to the drilling fluid in suitable quantity in order to deposit the same on the wall of the bore-hole to maintain a low water loss. This can best be shown by a number of examples, in the form of tables.

*Table I.—Treatment of 4 grams per deciliter zeogel-saturated salt-water drilling fluid\**

| Material Added | Amt. Added GMS/DL | Initial Data | | | 24 Hour Data | | |
|---|---|---|---|---|---|---|---|
| | | Visc. Cpe. | pH | 30' Corr. W. L. cc. | Visc. Cpe. | pH | 30' Corr. W. L. cc. |
| Blank, No Treatment | 0 | 5.0 | 7.40 | 126.4 | 5.5 | 7.65 | 125.2 |
| Applicants' process dextrin. | 1 | 8.3 | 6.90 | 25.6 | 9.0 | 7.15 | 32.0 |
| | 2 | 10.0 | 6.40 | 6.6 | 9.5 | 7.00 | 6.4 |
| | 4 | 17.0 | 6.25 | 3.4 | 14.0 | 6.80 | 2.6 |
| Prior art process dextrin. | 1 | 6.9 | 8.70 | 75.2 | 6.7 | | 76.0 |
| | 2 | 10.5 | 6.90 | 16.0 | 8.3 | 7.10 | 8.0 |
| | 4 | 18.0 | 6.50 | 4.8 | 10.5 | 6.80 | 3.6 |

*A fuller's earth of the Georgia-Florida type.

From the above it will be seen that while the prior art process dextrin reduces the water loss, the reductions are not as rapid with equal quantities of dextrin added as is the case with applicants' process dextrin; and that is particularly true with reference to the initial addition of one gram per deciliter. It will be understood that the above data was obtained in accordance with approved practices, A. P. I., the viscosity being in centipoises (Stormer).

*Table II.—Treatment of 3.75% California bentonite drilling fluid weighted to 71 pounds per cu. ft. with barytes, plus 1 pound per barrel sodium hydroxide*

| Material Added | Amt. Added GMS/DL | Initial Data | | | 24 Hour Data | | |
|---|---|---|---|---|---|---|---|
| | | Visc. Cpe. | pH | 30' Corr. W. L. cc. | Visc. Cpe. | pH | 30' Corr. W. L. cc. |
| Blank | 0 | 4.9 | 12.00 | 16.8 | 3.5 | 12.00 | 17.6 |
| Applicants' Process Dextrin. | 1 | 7.2 | 11.90 | 8.6 | 5.9 | 11.95 | 8.4 |
| | 2 | 12.0 | 12.10 | 7.1 | 8.0 | 12.05 | 6.0 |
| | 4 | 26 | 11.65 | 4.6 | 16.0 | 11.70 | 3.4 |
| Prior art Process Dextrin. | 1 | 5.9 | 11.95 | 9.0 | 5.5 | 12.00 | 9.2 |
| | 2 | 13.0 | 12.10 | 6.9 | 9.5 | 12.05 | 6.7 |
| | 4 | 17.5 | 11.75 | 5.8 | 14.5 | 11.75 | 5.2 |

The above again shows the superiority of applicants' process dextrin in reducing water losses, particularly after twenty-four hours.

*Table III.—Treatment of 3.75% of California bentonite in tap water (Los Angeles), weighted to 71 pounds per cubic foot with barytes, plus 1 pound per barrel of para-formaldehyde*

| Material Added | Amt. Added GMS/DL | Initial Data | | | 24-Hour Data | | | After 11 Days Standing At Room Temperature | |
|---|---|---|---|---|---|---|---|---|---|
| | | Visc. Cpe. | pH | 30' Corr. W. L. cc. | Visc. Cpe. | pH | 30' Corr. W. L. cc. | Visc. Cpe. | 30' Corr. W. L. cc. |
| Blank | 0 | 22.5 | 9.00 | 18.6 | 23 | 8.80 | 17.4 | 34 | 18.0 |
| Applicants' Process Dextrin | 1 | 39 | 8.90 | 12.4 | 43 | 8.75 | 12.0 | 50 | 14.4 |
| | 2 | 27 | 8.75 | 6.4 | 30 | 8.70 | 6.9 | | |
| | 4 | 65 | 8.65 | 5.2 | 78 | 8.55 | 5.2 | 81 | 4.8 |
| Prior art Process Dextrin | 1 | 28 | 8.95 | 17.2 | 30 | 8.80 | 17.6 | 39 | 17.8 |
| | 2 | 22 | 8.90 | 12.4 | 25 | 8.65 | 12.0 | | |
| | 4 | 40 | 8.80 | 12.8 | 49 | 8.70 | 12.4 | 65 | 13.4 |

The above test again shows the superiority of applicants' process dextrin in reducing water losses at a low pH, as distinguished from Table II, where the conditions were at high pH to avoid deterioration of the starch, while in Table III the preservative was used for that purpose.

From the above it will be seen that modified-starch dextrins are useful for the treatment of drilling fluids, in order to reduce water losses, as well as to obtain satisfactory consistency of the drilling fluid. While modified-starch dextrins are generally suitable for the treatment of drilling fluids, those produced in accordance with applicants' process are particularly suitable.

The invention having thus been described, what is claimed is:

1. In the art of drilling wells by the employment of an aqueous mud-laden well drilling fluid which is subject to additions thereto of formation solids, fluid and salts during the course of drilling, the process comprising, pumping the drilling fluid into the bore-hole and back to the surface causing a solid component of the fluid to be deposited on the bore-hole wall and adding to such a fluid during the course of drilling, and in an amount sufficient to deposit on the wall of the bore-hole to maintain a low water loss, a modified-starch-dextrine produced by subjecting a starchy material to a temperature of 220–250° C. for a short period, about fifteen minutes, followed by allowing the same to cool.

2. In the art of drilling wells by the employment of an aqueous mud-laden well drilling fluid which is subject to additions thereto of formation solids, fluid and salts during the course of drilling, the process comprising, pumping the drilling fluid into the bore-hole and back to the surface causing a solid component of the fluid to be deposited on the bore-hole wall and adding to such a fluid during the course of drilling and in an amount sufficient to deposit on the wall of the bore hole to maintain a low water loss, a modified-starch-dextrine which has a pH of about 4, and produced by subjecting a starchy material to a temperature of 220–250° C. for a short period, about fifteen minutes, followed by allowing the same to cool.

3. In the art of drilling wells by the employment of an aqueous clay-laden drilling fluid which is subject to additions thereto of formation solids, fluid and salts during the course of drilling, the process comprising, adding to such a fluid during the course of drilling a modified-starch-dextrine.

4. An aqueous well-drilling fluid containing sufficient of a modified-starch-dextrine produced by subjecting a starchy material to a temperature of 220–250° C. for a short period, about fifteen minutes, followed by allowing the same to cool, to attain a low water loss.

5. An aqueous well-drilling fluid containing sufficient of a modified-starch-dextrine which has a pH of about 4 and produced by subjecting a starchy material to a temperature of 220–250° C. for a short period, about fifteen minutes, followed by allowing the same to cool, to attain a low water loss.

GEORGE W. CUMMER.
DELMAR H. LARSEN.

REFERENCES CITED

The following references are of record in the file of this patent:

UNITED STATES PATENTS

| Number | Name | Date |
|---|---|---|
| 2,191,312 | Cannon | Feb. 20, 1940 |
| 2,209,591 | Barnes | July 30, 1940 |
| 2,359,378 | Morris | Oct. 3, 1944 |
| 2,417,307 | Larsen | Mar. 11, 1947 |

OTHER REFERENCES

The Treatment, with a View to Reduction of Viscosity, of the Mud Fluids Used in Drilling Operations, Article in "Petroleum" (German Pub.), Issue No. 44, pgs. 7–8, Nov. 2, 1932.